Patented Aug. 28, 1945

2,383,763

UNITED STATES PATENT OFFICE 2,383,763

CRYSTALLIZATION OF SALTS FROM AQUEOUS SOLUTIONS

Rudolf Bloch and Isaac Schnerb, Jerusalem, Palestine, assignors to Palestine Potash Ltd., Jerusalem, Palestine, a British company No Drawing. Application January 21, 1943, Serial No. 473,114. In Palestine November 10, 1942

14 Claims. (Cl. 23—295)

This invention relates to the crystallization of salts from their aqueous solutions by the evaporation of the water by means of solar radiation and has as its object to increase the rate of evaporation of the water. The term "evaporation" as used in connection with this invention is not meant to imply that the solution must be evaporated to dryness but the invention applies equally to the case that by the evaporation, the salt solution is only concentrated to the desired extent.

The invention is especially, but by no means exclusively, useful in connection with the crystallization of salts from natural brines, particularly from sea water, such as sodium or potassium chloride, carnallite, potassium bromide and the like.

It has earlier been ascertained that the evaporation process can be accelerated by dissolving in the brine a dyestuff absorbing the visible part of the solar spectrum, or at least a substantial portion thereof, the dyestuff being advantageously so selected that the ultra-red rays of solar radiation near the visible light are equally absorbed.

We have now found that a particularly efficient colouring of salt solutions for the purpose in view may be obtained by means of a dry mixture containing Schäffer's salt (that is, an alkali or ammonium salt of 2-naphthol-6-sulfonic acid), an alkali nitrite and an iron salt in which mixture the said substances are suitably present in a proportion of about one mole of nitrite and half a mole of iron salt (in the case of a ferrous compound, for example, ferrous sulfate) or one third of a mole of iron salt (in the case of a ferric compound, for example, ferric chloride) for each mole of Schäffer's salt; the formation of a dyestuff taking place by the interaction of said substances on taking up the mixture in water or a neutral salt solution. The reaction thus occurring is, of course, the introduction into the molecule of Schäffer's salt of a nitroso group and the combination of a number of molecules of nitroso-Schäffer's salt with an iron atom into a complex molecule, as described in our co-pending patent application Serial No. 473,113. The reaction liquor so obtained has a dark brown colour and turns green on diluting it with water or a neutral salt solution, or by adding alkali until a neutral or slightly alkaline reaction is obtained.

The green dyestuff so produced appears to be closely related to, or identical with, naphthol green. However, it has been ascertained that when admixed to the salt brine to be evaporated, the dyestuff according to this invention is definitely faster than solid naphthol green dissolved in the same brine: If equal portions of the same brine are coloured respectively with solid naphthol green and an equal concentration of the dyestuff according to this invention, the latter portion retains its green colour longer than the former one.

The said dry mixture may directly be dissolved in the brine to be evaporated, provided the salt concentration of the latter is not too high, say not higher than ordinary sea water. However, as the amount of dyestuff required for producing the correct shade of the brine is rather small, the concentration of the reagents in the brine would in most cases be too small to allow the reaction between them to come about. Therefore, it is advisable to prepare separately a dyestuff solution in water or a dilute brine and to add this to the brine to be evaporated.

Example

A dry mixture is prepared from 100 grs. of Schäffer's salt, 32 grs. of sodium nitrite and 60 grs. of ferrous sulfate ($FeSO_4 \cdot 7H_2O$). All the components must be dry. The mixture is a yellowish powder which, if protected against the access of moisture, keeps for a long time.

24 grs. of this mixture are dissolved under stirring in 300 grs. of water, the temperature of the solution being kept below 30° C. By the reaction which starts soon, a dark brown liquor is obtained.

Of this liquor, about 40 ccs. are added to each cubic meter of the brine to be evaporated whereby the latter assumes a bright green colour. Of course, the amount of dyestuff to be added to the brine may vary within wide limits, according to the concentration of the brine and climatic factors including the intensity of the sun radiation available, the average wind velocity and the humidity of the air. The increase of evaporation is roughly proportional to the amount of dyestuff added. It is to be noted, however, that there exists a certain optimal proportion, to be determined according to the special circumstances of each case, beyond which the addition of even large amounts of dyestuff entails only a relatively small further increase of the rate of evaporation so that the addition of dyestuff beyond this optimal proportion will generally not pay. There exists, of course, an absolute limit beyond which no amount of dyestuff can produce any further increase of the rate of evaporation. This limit is given by the quantity of dyestuff sufficient for a total absorption of the impinging radiation.

We claim:

1. In the crystallization of salts from their aqueous solutions by evaporation by means of solar radiation, the steps of dissolving in an aqueous liquid a dry mixture containing Schäffer's salt, an alkali nitrite and an iron salt, allowing the said substances to react with one another, converting the reaction liquor into a green dyestuff solution adapted to increase the rate of evaporation of the water from said salt solution by diluting the reaction liquor with an aqueous liquid adding said green dyestuff solution to the aqueous solution to be evaporated and subjecting the latter to solar radiation.

2. In the crystallization of salts from their aqueous solutions by evaporation by means of solar radiation, the steps of dissolving in an aqueous liquid a dry mixture containing Schäffer's salt, an alkali nitrite and an iron salt, allowing the said substances to react with one another, converting the reaction liquor into a green dyestuff solution adapted to increase the rate of evaporation of the water from said salt solution by adding an alkaline reacting substance to said reaction liquor adding said green dyestuff solution to the aqueous solution to be evaporated and subjecting the latter to solar radiation.

3. In the crystallization of salts from their aqueous solutions by evaporation by means of solar radiation, the steps of dissolving in an aqueous liquid a dry mixture containing Schäffer's salt, sodium nitrite and ferrous sulfate in a proportion of substantially one mole of sodium nitrite and half a mole of ferrous sulfate for each mole of Schäffer's salt, allowing said substances to react with one another; adding the reaction liquor to the salt solution to be evaporated to obtain a green solution, and subjecting the latter to solar radiation.

4. In the process of recovering salts from their aqueous solutions by dyeing the latter with a dyestuff absorbing at least a portion of the solar spectrum, and evaporating the solutions by means of solar radiation, the improvement which comprises dyeing said solutions by means of a product obtained by reacting a mixture containing Schäffer's salt, an alkali nitrite and an iron salt in an aqueous liquid in the absence of added acid.

5. The process set forth in claim 4 in which said product is treated with a substance having an alkaline reaction, and then dissolved in said solutions.

6. The process set forth in claim 4 in which said product is diluted with an aqueous liquid and then dissolved in said solutions.

7. The process set forth in claim 4 in which the components of said mixture are present in a proportion of substantially one mol of nitrite and ½ mol of ferrous salt for each mol of Schäffer's salt.

8. The process set forth in claim 4 in which the components of said mixture are present in a proportion of substantially one mol of nitrite and ⅓ mol of ferric salt for each mol of Schäffer's salt.

9. In the crystallization of salts from their aqueous solutions by evaporation by means of solar radiation, the steps of dissolving in an aqueous liquid a dry mixture containing Schäffer's salt, an alkali nitrite and an iron salt, allowing said substances to react with one another, converting the reaction liquor into a green dyestuff solution adapted to increase the rate of evaporation of the water from the salt solution to be evaporated, and subjecting the salt solution to be evaporated to solar radiation in the presence of said dyestuff solution.

10. In the crystallization of salts from their aqueous solutions by evaporation by means of solar radiation, the steps of dissolving in water a dry mixture containing Schäffer's salt, an alkali nitrite and an iron salt, allowing the said substances to react with one another, converting the reaction liquor into a green dyestuff solution adapted to increase the rate of evaporation of the water from the salt solution to be evaporated, and subjecting the salt solution to be evaporated to solar radiation in the presence of said dyestuff solution.

11. In the crystallization of salts from their aqueous solutions by evaporation by means of solar radiation, the steps of dissolving in a dilute aqueous salt solution a dry mixture containing Schäffer's salt, an alkali nitrite and an iron salt, allowing the said substances to react with one another, converting the reaction liquor into a green dyestuff solution adapted to increase the rate of evaporation of the water from the salt solution to be evaporated, and subjecting the salt solution to be evaporated to solar radiation in the presence of said dyestuff solution.

12. In the crystallization of salts from their aqueous solutions by evaporation by means of solar radiation, the steps of dissolving in the salt solution to be evaporated a dry mixture containing Schäffer's salt, an alkali nitrite and an iron salt, allowing said substances to react with one another, converting the reaction liquor into a green dyestuff solution adapted to increase the rate of evaporation of the water from said salt solution and subjecting said salt solution to solar radiation.

13. In the crystallization of salts from their aqueous solutions by evaporation by means of solar radiation, the steps of dissolving in an aqueous liquid a dry mixture containing Schäffer's salt, an alkali nitrite and a ferrous salt in a proportion of substantially one mole of alkali nitrite and half a mole of ferrous salt for each mole of Schäffer's salt, allowing the said substances to react with one another, converting the reaction liquor into a green dyestuff solution adapted to increase the rate of evaporation of the water from the salt solution to be evaporated, and subjecting the salt solution to be evaporated to solar radiation in the presence of said dyestuff solution.

14. In the crystallization of salts from their aqueous solutions by evaporation by means of solar radiation, the steps of dissolving in an aqueous liquid a dry mixture containing Schäffer's salt, an alkali nitrite and a ferric salt in a proportion of substantially one mole of nitrite and one-third of a mole of ferric salt for each mole of Schäffer's salt, allowing the said substances to react with one another, converting the reaction liquor into a green dyestuff solution adapted to increase the rate of evaporation of the water from the salt solution to be evaporated, and subjecting the salt solution to be evaporated to solar radiation in the presence of said dyestuff solution.

RUDOLF BLOCH.
ISAAC SCHNERB.